United States Patent
Kato et al.

(10) Patent No.: US 6,301,540 B1
(45) Date of Patent: Oct. 9, 2001

(54) SYSTEM FOR DETECTING DIFFERENCE IN ROAD LEVEL

(75) Inventors: Toshihisa Kato, Anjo; Masaki Banno, Nagoya; Yasuhiro Abe, Toyota; Shinji Tsugawa, Obu; Hiroyuki Matsubayashi, Susono, all of (JP)

(73) Assignees: Aisin Seiki; Toyota Jidosha, both of Kabushiki Kaisha (JP)

( * ) Notice: Subject to any disclaimer, the term of this patent is extended or adjusted under 35 U.S.C. 154(b) by 0 days.

(21) Appl. No.: 09/317,632

(22) Filed: May 25, 1999

(30) Foreign Application Priority Data

May 26, 1998 (JP) .................................... 10-162947

(51) Int. Cl.$^7$ .................. B60T 8/58; B60T 8/60
(52) U.S. Cl. .................. 701/71; 701/79; 701/80; 303/150; 303/157; 303/183
(58) Field of Search ................ 701/71, 79, 80; 303/100, 154, 150, 157, 183; 280/707

(56) References Cited

U.S. PATENT DOCUMENTS

| | | | |
|---|---|---|---|
| 4,900,100 | * | 2/1990 | Higashimata et al. .......... 303/100 |
| 4,903,982 | * | 2/1990 | Harara et al. .......... 280/707 |
| 5,132,907 | * | 7/1992 | Ishikawa .......... 364/426.02 |
| 5,236,255 | * | 8/1993 | Kuwana et al. .......... 303/106 |
| 5,423,601 | | 6/1995 | Sigl . |
| 6,045,198 | * | 4/2000 | Naito et al. .......... 303/154 |

FOREIGN PATENT DOCUMENTS

| | | |
|---|---|---|
| 39 33 652 | 4/1991 | (DE) . |
| 5-213178 | 8/1993 | (JP) . |
| 5-294226 | 11/1993 | (JP) . |

\* cited by examiner

*Primary Examiner*—William A. Cuchlinski, Jr.
*Assistant Examiner*—Tuan C To
(74) *Attorney, Agent, or Firm*—Burns, Doane, Swecker & Mathis, LLP (57) ABSTRACT

The present invention is directed to a system for detecting a difference in level on a road, wherein an acceleration sensor is provided for detecting an acceleration of a vehicle, and a wheel speed sensor is provided for detecting a wheel speed of at least one wheel of the vehicle. A wheel acceleration is calculated continuously on the basis of the wheel speed detected by the wheel speed sensor. It is determined if a variation of the signal output from the acceleration sensor is greater than a predetermined range. And, it is determined if the calculated wheel acceleration varied in the same direction as that of the variation of the signal output from the acceleration sensor, and then varied in the reverse direction to exceed a predetermined reference value. On the basis of the result of each determination, it is determined if the wheel ran over the difference in level on the road. If the affirmative result is obtained in each determination, the difference in level on the road can be detected.

7 Claims, 6 Drawing Sheets

SYSTEM FOR DETECTING DIFFERENCE IN ROAD LEVEL

This application claims priority under 35 U.S.C. Sec. 119 to No.10-162947 filed in Japan on May 26, 1998, the entire content of which is herein incorporated by reference.

BACKGROUND OF THE INVENTION

1. Field of the Invention

The present invention relates to a system for detecting a difference in road level, and more particularly to a system for determining if there is a difference in level on a road for vehicles by means of a linear longitudinal acceleration sensor.

2. Description of the Related Arts

Various anti-skid control systems have been proposed heretofore to prevent a wheel from being locked during a braking operation of a vehicle. For example, Japanese Patent Laid-open Publication No.5-294226 discloses an anti-skid control system which is adapted to detect a road giving a rapid variation of surface reaction force, such as a road with a difference in level, and prevent a hydraulic barking pressure from being reduced, or increase a pressure increasing gradient of the hydraulic braking pressure, thereby to improve the feeling in driving a vehicle. In the anti-skid control system as disclosed in the above-described publication, there is provided a road surface detection system which compares a wheel acceleration and a wheel speed which is reduced just before the ant-skid control starts, or just after it started, with respective predetermined levels, to determine if the road, on which the vehicle travels under the anti-skid control, is giving the rapid variation of surface reaction force.

According to the road surface detection system as disclosed in the above-described Japanese Patent Laid-open Publication No.5-294226, the difference in level on the road is detected on the basis of the reduced wheel acceleration and wheel speed, or recovered wheel acceleration and wheel speed. Therefore, vibration or the like of driven wheels might result in misjudgment of the difference in level on the road, especially on a road of low coefficient of friction. In the case where the above-described road surface detection system is used for the anti-skid control, it is necessary to prevent the wheels from being locked rapidly on the road of low coefficient of friction.

SUMMARY OF THE INVENTION

Accordingly, it is an object of the present invention to provide a system for detecting a difference in level on a road for vehicles, to properly determine if a vehicle is traveling on the road with difference in level.

It is another object of the present invention to provide a system for properly detecting a difference in level on a road for vehicles, thereby to perform an anti-skid control or a traction control smoothly.

In accomplish the above and other objects, a system for detecting a difference in level on a road for vehicles is proposed herein. The system includes an acceleration sensor, which detects an acceleration of a vehicle and produce a signal proportional to the acceleration. A first determination device is provided for determining if a variation of the signal output from the acceleration sensor is greater than a predetermined range. A wheel speed detection device is provided for detecting a wheel speed of at least one wheel of the vehicle. A wheel acceleration calculating device is provided for calculating a wheel acceleration of the wheel continuously on the basis of the wheel speed detected by the wheel speed detection device. And, a second determination device is provided for determining if the wheel acceleration calculated by the wheel acceleration calculating device varied in the same direction as that of the variation of the signal output from the acceleration sensor, and then varied in the reverse direction to exceed a predetermined reference value. Then, a level difference determination device is provided for determining if the wheel ran over a difference in level on a road, on the basis of the results determined by the first and second determination devices. The first determination device may be adapted to determine if the variation of the signal output from the acceleration sensor is greater than the predetermined range, on the basis of a variation of the wheel acceleration calculated by the wheel acceleration calculating device.

In the above-described system, the first determination device may be adapted to determine if a decelerating variation of the signal output from the acceleration sensor is greater than a predetermined decelerating range, and the second determination device may be adapted to determine if the wheel acceleration calculated by the wheel acceleration calculating device has been increased after the wheel acceleration was decreased, to exceed a predetermined acceleration.

Or, the first determination device may be adapted to determine if an accelerating variation of the signal output from the acceleration sensor is greater than a predetermined accelerating range, and the second determination device may be adapted to determine if the wheel acceleration calculated by the wheel acceleration calculating device has been decreased after the wheel acceleration was increased, to become lower than a predetermined deceleration.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
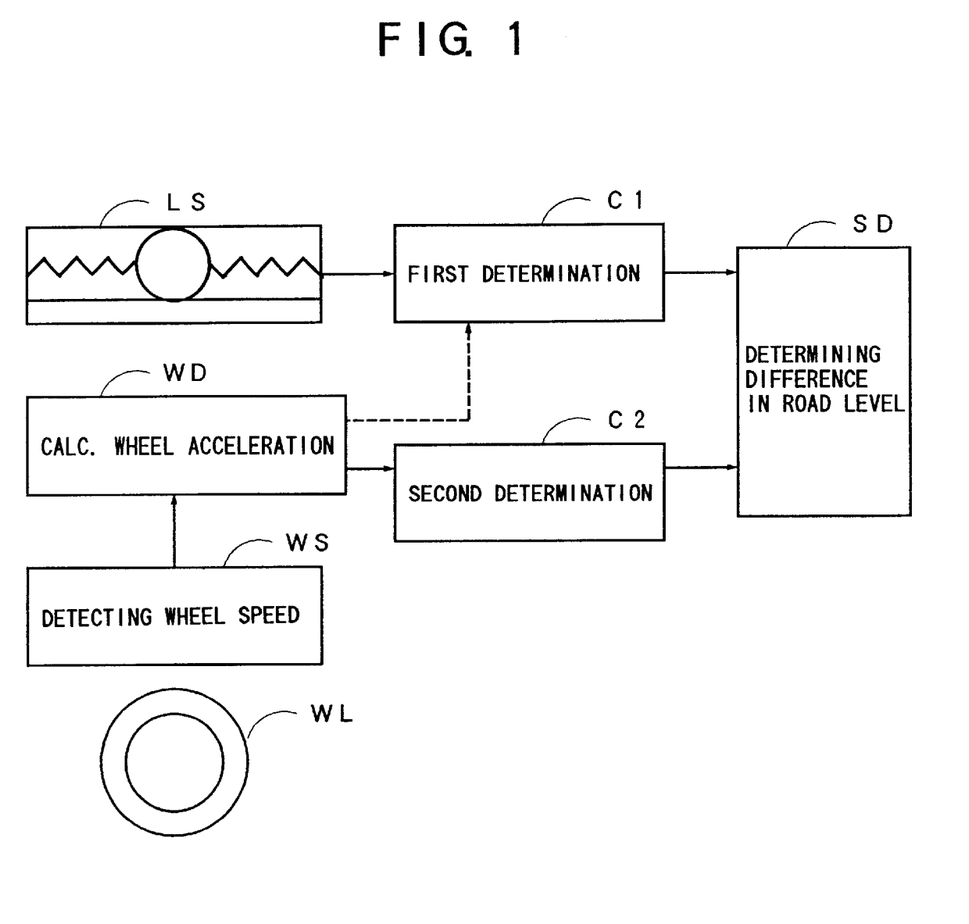
FIG. 1 is a block diagram illustrating a system for detecting a difference in level on a road for vehicles according to an embodiment of the present invention.

Referring to FIG. 1, there is schematically illustrated a system for detecting a difference in level on a road for vehicles according to an embodiment of the present invention, wherein a linear acceleration sensor (LS) is provided for detecting an acceleration of the vehicle in a longitudinal direction thereof and producing a signal linearly proportional to the detected acceleration. A first determination device (C1) is connected to the linear acceleration sensor (LS), to determine if a variation of the signal output from the acceleration sensor (LS) is greater than a predetermined range. A wheel speed detection device (WS) is provided for detecting a wheel speed of at least one wheel (WL) of the vehicle. A wheel acceleration calculating device (WD) is provided for calculating a wheel acceleration of the wheel continuously on the basis of the wheel speed detected by the wheel speed detection device (WS). And, a second determination device (C2) is provided for determining if the wheel acceleration calculated by the wheel acceleration calculating device (WD) varied in the same direction as that of the variation of the signal output from the acceleration sensor (LS), and then varied in the reverse direction to exceed a predetermined reference value. Then, it is determined by a level difference determination device (SD) if the wheel ran over the difference in level on the road, on the basis of the results determined by the first and second determination devices (C1, C2).

The first determination device (C1) is adapted to determine if the variation of the signal output from the acceleration sensor (LS) is greater than the predetermined range, on the basis of a variation of the wheel acceleration calculated by the wheel acceleration calculating device (WD). In the case where the wheel speed is reduced, for instance, it is determined that the variation is greater than the predetermined range, if an absolute value of a difference between a first signal, which is output from the sensor (LS) when the wheel acceleration has become a negative value, and a second signal which is output from the sensor (LS) when the wheel acceleration has changed from the negative value to a positive value, exceeds a predetermined value. And, the level difference determination device (SD) may be adapted to determine that the wheel ran over the difference in level on the road, if the first determination device (C1) determines that the variation of the signal output from the acceleration sensor (LS) is greater than the predetermined range, and the second determination device (C2) determines that the wheel acceleration calculated by the device (WD) exceeds the predetermined reference value.

Figure 2:
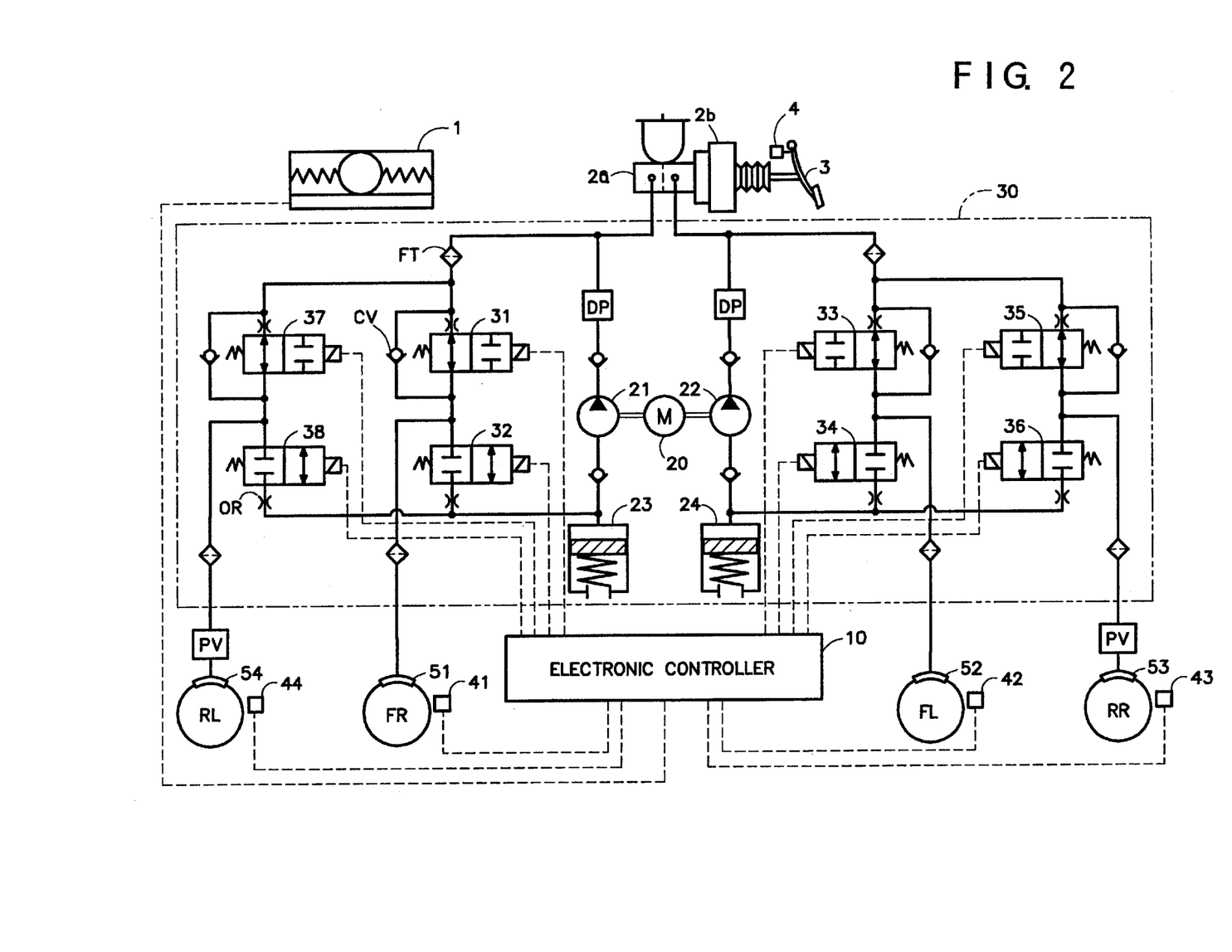
FIG. 2 is a block diagram illustrating an anti-skid control system which includes a system for detecting a difference in level on a road for vehicles according to an embodiment of the present invention.

FIG. 2 shows an anti-skid control system including the system for detecting the difference in level on the road according to the above-described embodiment, wherein a master cylinder 2a and a booster 2b are driven by a brake pedal 3 to serve as a hydraulic braking pressure generator. Wheel brake cylinders 51 to 54 are operatively mounted on wheels FR, FL, RR, RL of the vehicle, respectively. The wheel FR designates the wheel at the front right side as viewed from the position of a driver's seat, the wheel FL designates the wheel at the front left side, the wheel RR designates the wheel at the rear right side, and the wheel RL designates the wheel at the rear left side. According to the present embodiment, a diagonal circuit (X-circuit) system is formed as shown in FIG. 2, while a front-rear dual circuit system may be formed.

Between the master cylinder 2a and the wheel brake cylinders 51 to 54, an actuator 30 is disposed for use in the anti-skid control (ABS). The actuator 30 is formed as enclosed by a two-dot chain line in FIG. 2. Normally open solenoid valves 31, 37 are disposed in hydraulic pressure passages for connecting one output port of the master cylinder 2a with the wheel brake cylinders 51, 54, respectively, and an output port of a hydraulic pressure pump 21 is connected to a position between the master cylinder 2a and the valves 31, 37. Likewise, normally open solenoid valves 33, 35 are disposed in passages for connecting another output port of the master cylinder 2a with the wheel brake cylinders 52, 53, respectively, and an output port of a hydraulic pressure pump 22 is connected to a position between the master cylinder 2a and the valves 33, 35. The hydraulic pressure pumps 21, 22 are driven by an electric motor 20 to supply pressurized brake fluid into each hydraulic pressure passage. The wheel brake cylinders 51, 54 are connected to the normally closed solenoid valves 32, 38, the downstream sides of which are connected to a reservoir 23 and the input port of the pump 21. The wheel brake cylinders 52, 53 are connected to the normally closed solenoid valves 34, 36, the downstream sides of which are connected to a reservoir 24 and the input port of the pump 22. Each of the reservoirs 23, 24 has a piston and a spring as shown in FIG. 2 to store the brake fluid discharged from the wheel brake cylinders through the solenoid valves 32, 34, 36, 38.

The solenoid valves 31 to 38 are of two-port two-position solenoid operated changeover valves which are placed in their first operating positions as shown in FIG. 2 to communicate the wheel brake cylinders 51 to 54 with the master cylinder 2a. When the solenoids of the valves are energized, they are placed in their second operating positions to block the communication between the wheel brake cylinders 51 to 54 and the master cylinder 2a, and communicate the wheel brake cylinders 51 to 54 with the reservoir 23 or 24. In FIG. 2, "PV" indicates a proportioning valve, "DP" indicates a damper, "CV" indicates a check valve, "OR" indicates an orifice, and "FT" indicates a filter. Each check valve CV is provided for allowing the flow of the brake fluid from the wheel brake cylinders 51 to 54 and reservoirs 23, 24 toward the master cylinder 2a and preventing the reverse flow. With the solenoid valves 31 to 38 controlled to be energized or de-energized, the hydraulic braking pressure in the wheel brake cylinders 51 to 54 will be increased, decreased or held. That is, when the solenoid valves 31 to 38 are de-energized, the hydraulic braking pressure in the master cylinder 2a and the pressure pump 21 or 22 is supplied into the wheel brake cylinders 51 to 54 to increase the hydraulic braking pressure therein, whereas when the solenoid valves 31 to 38 are energized, the wheel brake cylinders 51 to 54 are communicated with the reservoir 23 or 24 to decrease the hydraulic braking pressure in the wheel brake cylinders 51 to 54. Or, when the solenoid valves 31, 33, 35, 37 are energized, and the solenoid valves 32, 34, 36, 38 are de-energized, the hydraulic pressure in the wheel brake cylinders 51 to 54 will be held. Therefore, by controlling the time period between the energizing the solenoid valves and de-energizing them, a pulse pressure increasing, or stepped pressure increasing operation will be performed to increase the pressure gradually, or may be performed to decrease the pressure gradually.

The solenoid valves 31 to 38 are electrically connected to an electronic controller 10 to energize or de-energize each solenoid coil. Wheel speed sensors 41 to 44 are mounted on the wheels FR, FL, RR, RL to feed rotational speeds of the wheels, i.e., wheel speed signals to the controller 10, respectively. A linear longitudinal acceleration sensor 1 (hereinafter, referred to as a linear G sensor 1), which serves as the acceleration sensor according to the present invention, is mounted on the vehicle, to feed its output signal to the controller 10. Furthermore, a brake switch 4, which is turned on when the brake pedal 3 is depressed, and etc. are connected to the controller 10. The linear G sensor 1 is a sensor for converting a movement of a weight in a longitudinal direction, which is caused in accordance with the acceleration or deceleration of the vehicle, into an electric signal to be linearly proportional to the vehicle acceleration (including the deceleration). The linear G sensor 1 has already been on the market, so that its detailed explanation will be omitted. The electronic controller 10 is provided with a microcomputer (not shown) which includes a central processing unit (CPU), memories (ROM, RAM), a timer, an input interface, an output interface, and etc.

Figure 3A:
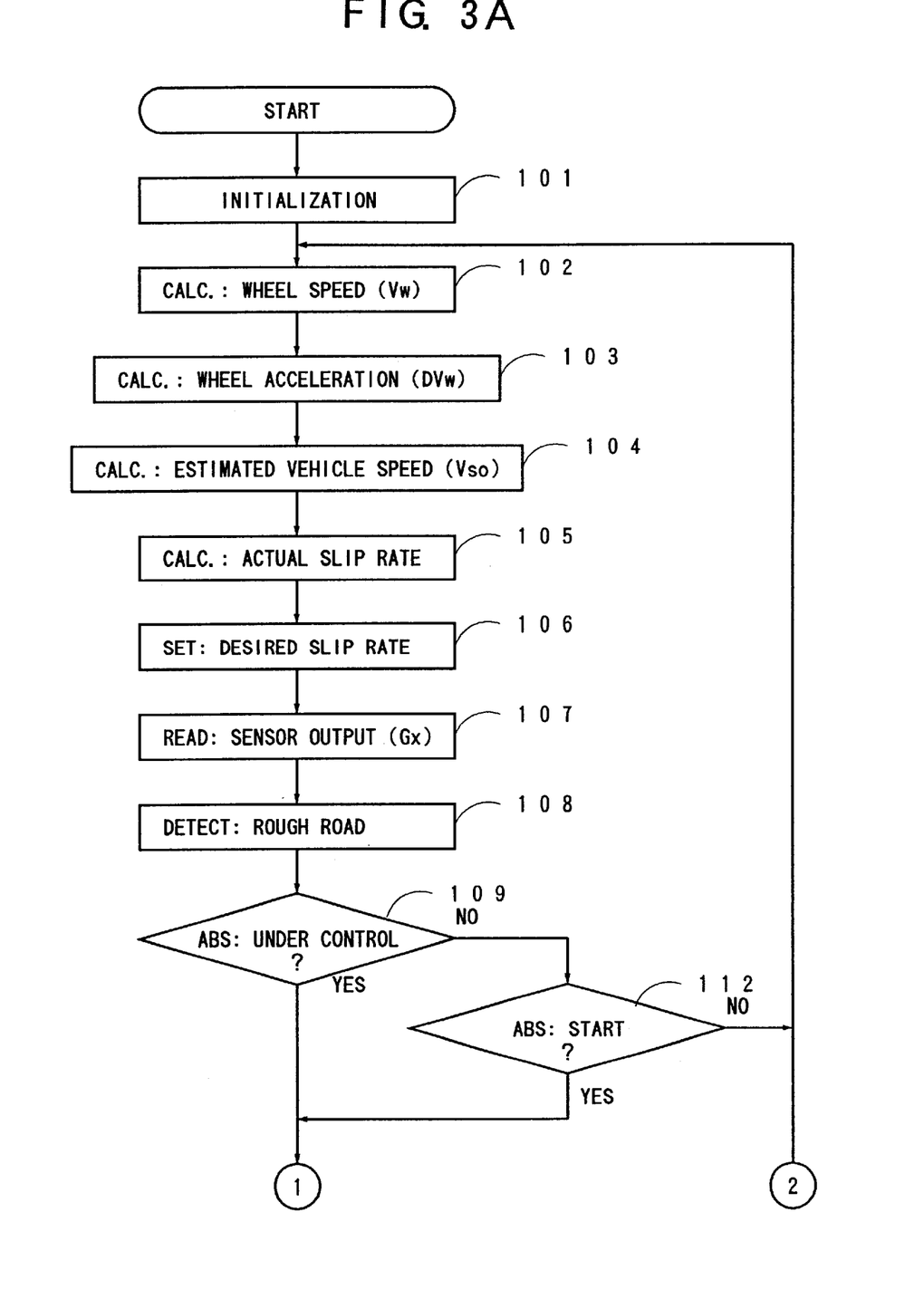
FIG. 3A and FIG. 3B are flowcharts showing a main routine of an anti-skid control according to an embodiment of the present invention.
Figure 3B:
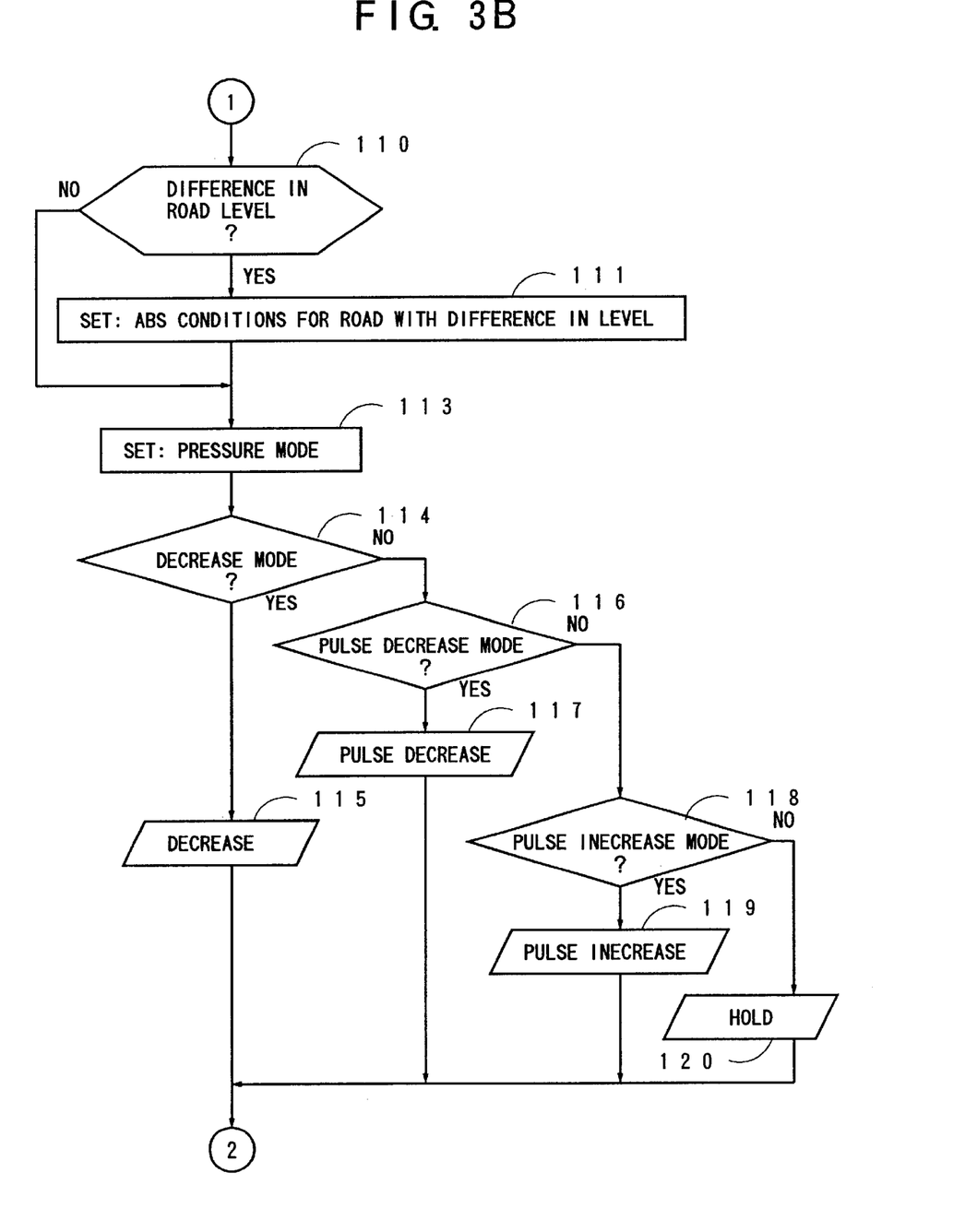

According to the present embodiment as constituted above, the anti-skid control will be performed by the controller 10 to control the actuator 30, in accordance with a program as shown in FIGS. 3A, 3B. The program routine starts when an ignition switch (not shown) is turned on. At the outset, the program provides for initialization of the system at Step 101 to clear various data. At Step 102, the signals detected by the wheel speed sensors 41 to 44 are read by the controller 10 to calculate each wheel speed (represented by "Vw"), and differentiated to provide a wheel acceleration (DVw, including a wheel deceleration). At Step 104, an estimated vehicle speed (Vso) is calculated on the basis of each wheel speed (Vw). The estimated vehicle speed (Vso) may be calculated by MED($\alpha_{DN}$t, Vw, $\alpha_{UP}$ t). The "MED" indicates a function for obtaining an intermediate value. "$\alpha_{UP}$" sau is a value indicative of an upper limit side (to be greater than the wheel speed (Vw)) of the vehicle acceleration (including the deceleration), "$\alpha_{DN}$" is a value indicative of a lower limit side (to be smaller than the wheel speed (Vw)) of the vehicle acceleration (including the deceleration), and "t" indicates a time. The vehicle speed may be detected directly by a sensor for detecting the speed of the vehicle relative to the ground.

The program proceeds to Step 105, where an actual slip rate of each wheel for use in the anti-skid control (represented by "Sa") is calculated, in accordance with the following equation:

$$Sa=(Vso-Vw)/Vso$$

Then, at Step 106, a desired slip rate is set for each wheel. Next at Step 107, an output (Gx) of the linear G sensor 1 is read. At Step 108, a determination of a rough road is made. The rough road in this case includes not only an unpaved road with difference in level, but also a stone pavement and a snow road. And, the program proceeds to Step 109, where it is determined whether the anti-skid control is being performed or not. If the anti-skid control is being performed, the program proceeds to Step 110, where it is determined whether the vehicle is traveling on the road with difference in level or not, as described later in detail with reference to FIG. 4. If it is determined at Step 110 that the vehicle is traveling on the road with difference in level, the program proceeds to Step 111, where the conditions of the anti-skid control are set for the road with difference in level. Otherwise, the program proceeds to Step 113 as it is. The conditions of the anti-skid control for the road with difference in level set at Step 111 are provided for controlling the hydraulic braking pressure in each wheel brake cylinder when the vehicle is traveling on the road with difference in level, to be pressurized higher than the hydraulic braking pressure which is controlled during the anti-skid control operation when the vehicle is travelling on a paved road. Practically, provided is the pulse pressure increase mode with a pressure increasing period set to be longer than the period which is set when the vehicle is travelling on the paved road.

At Step 112, a locking condition of each wheel is determined on the basis of the wheel speed (Vw) and wheel acceleration (DVw), for example, so as to determine whether the conditions for initiating the anti-skid operation have been fulfilled or not. If the conditions have been fulfilled, the program proceeds to Step 110 and Steps following it as shown in FIG. 3B, otherwise the program returns to Step 102. Then, at Step 113, one of the pressure modes including the pressure decrease mode, pulse pressure decrease mode, pulse pressure increase mode and hold mode is selected on the basis of the locking condition of each wheel, and the program proceeds to Steps 114–120, where pressure control signals are output in accordance with the selected pressure mode. Accordingly, the solenoid coils of the valves 31 to 38 are energized or de-energized, in accordance with the selected pressure mode, to increase, decrease or hold the hydraulic braking pressure in the wheel brake cylinders 51 to 54 (i.e., wheel cylinder pressure).

Figure 4:
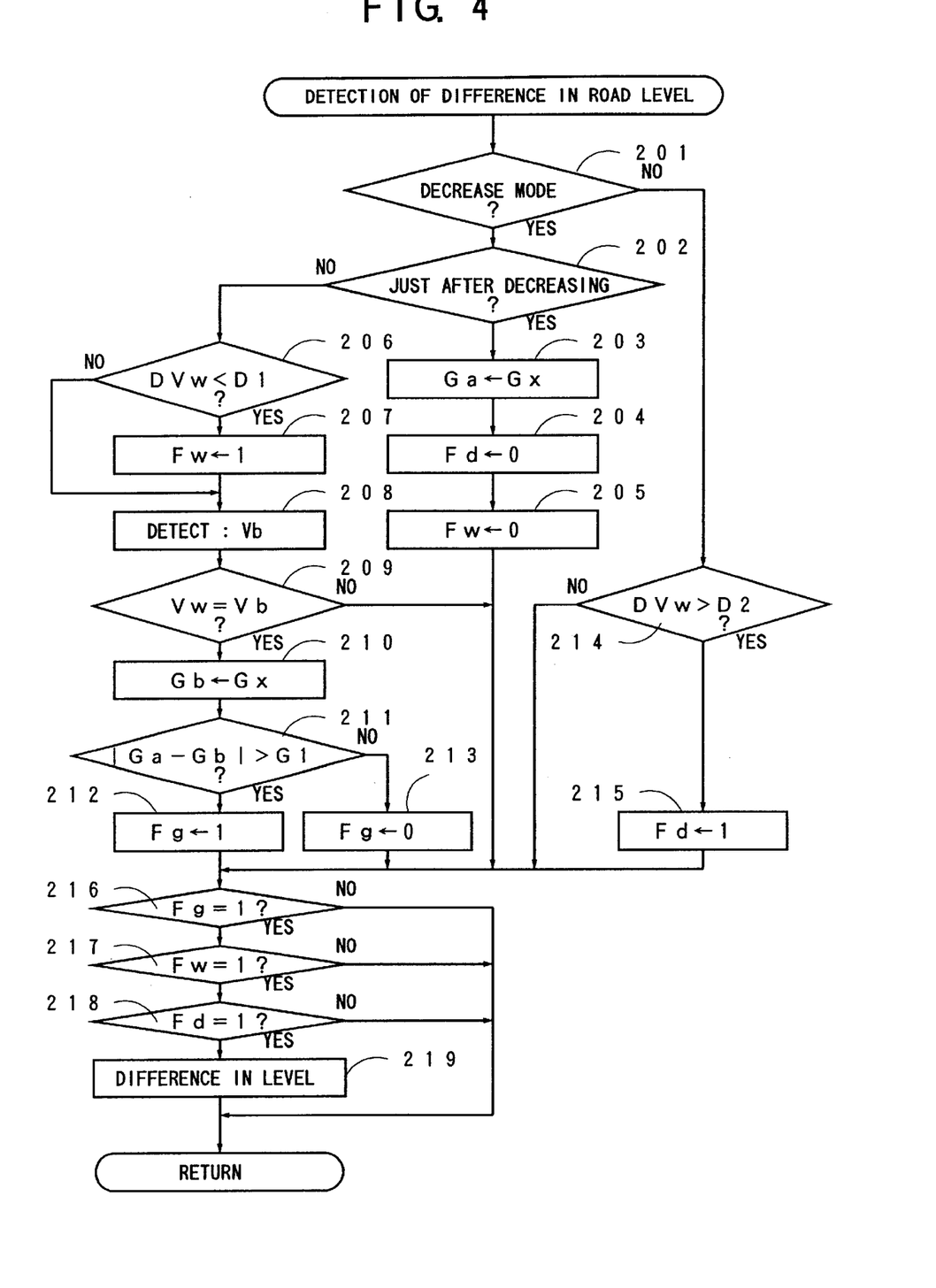
FIG. 4 is a flowchart showing a sub-routine for detecting a difference in level on a road according to an embodiment of the present invention.
Figure 5:
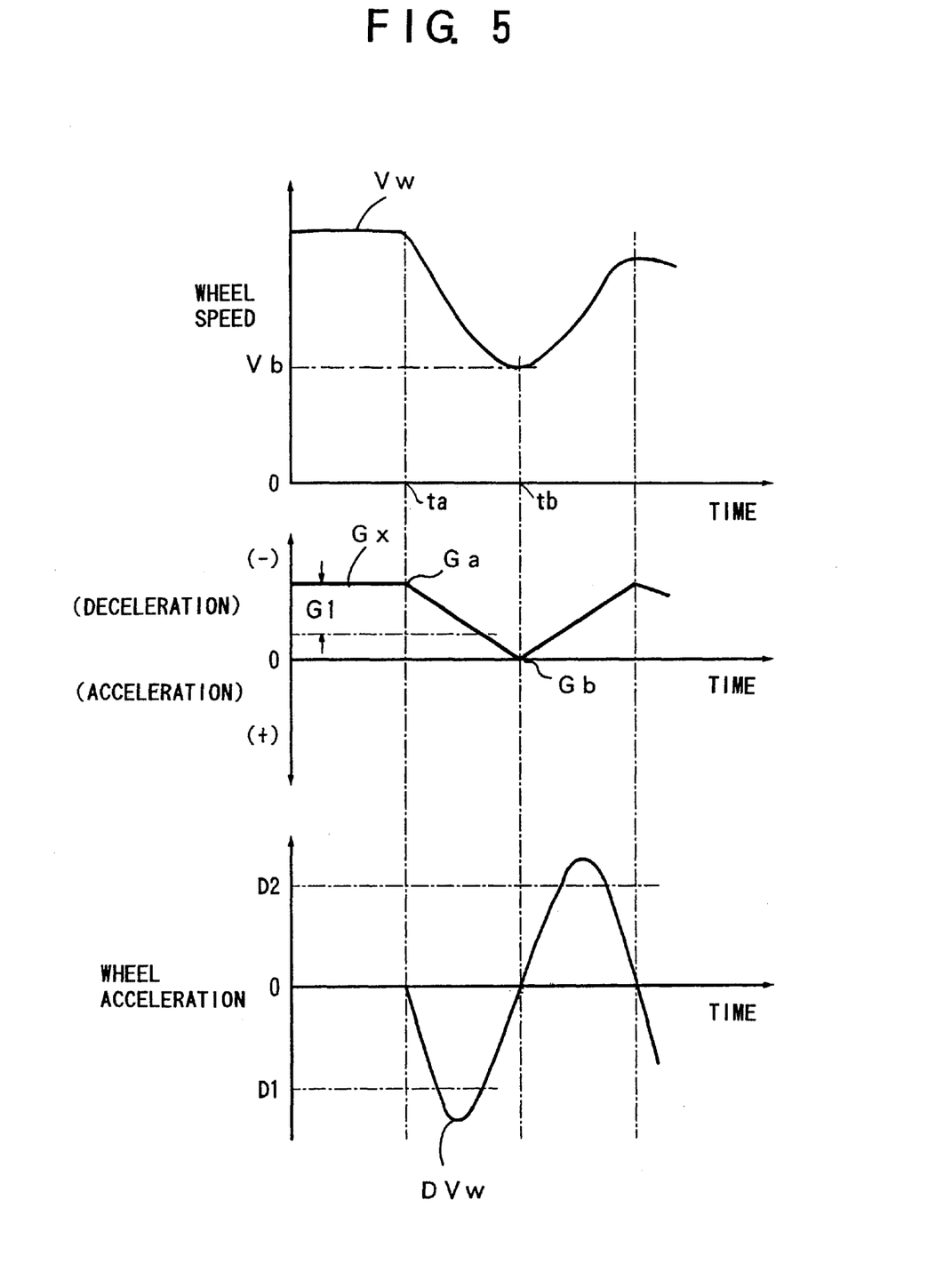
FIG. 5 is a diagram showing variations of a wheel speed, a wheel acceleration and an output of an acceleration sensor according to an embodiment of the present invention.

FIG. 4 shows the detection of the road with difference in level executed at Step 110 in FIG. 3A. At the outset, it is determined at Step 201 whether the pressure mode for the wheel brake cylinder to be controlled by the actuator 30 is the pressure decrease mode, or not. If it is the pressure decrease mode, the program proceeds to Step 202, where it is determined whether it is immediately after the pressure mode was changed into the decrease mode. For example, if it is immediately after the pressure mode was changed into the decrease mode, i.e., at "ta" in FIG. 5, the program proceeds to Step 203, where the output (Gx) of the linear G sensor 1 is set to be an initial value (Ga). Then, the program proceeds to Step 204 where a recovering acceleration flag (Fd) is reset to be zero, and further proceeds to Step 205 where a reduced wheel speed flag (Fw) is reset to be zero.

If it is determined at Step 202 that it is not immediately after the pressure mode was changed into the decrease mode, the program proceeds to Step 206 where the wheel acceleration (DVw) is lower than a predetermined reference value (D1) of a negative value. If the wheel acceleration (DVw) corresponds to the deceleration, the program proceeds to Step 207 where the reduced wheel speed flag (Fw) is set to be "1". Then, the program proceeds to Step 208 where a bottom value (Vb) of the wheel speed (Vw) is detected. Practically, when a wheel speed is changed from a negative value to a positive value, i.e., at "tb" in FIG. 5, it is set to be the bottom value (Vb). At Step 209, it is determined whether the wheel speed (Vw) corresponds to the bottom value (Vb). If the result is affirmative (Vw=Vb), the program proceeds to Step 210 where the output (Gx) of the linear G sensor 1 is set to be the bottom value (Gb). Then, at Step 211, a difference between the output (Gx) and the bottom value (Gb) is calculated (Ga−Gb), and its absolute value (|Ga−Gb|) is compared with a referenced value (G1). If the absolute value (|Ga−Gb|) of the difference is greater than the referenced value (G1), the program proceeds to Step 212, where it is determined that the output of the linear G sensor 1 has been reduced more than a predetermined range, so that a reduced output flag (Fg) is set to be "1". On the contrary, If the absolute value (|Ga−Gb|) of the difference is equal to or smaller than the referenced value (G1), the program proceeds to Step 213, where the reduced output flag (Fg) is reset to be zero.

Referring back to Step 201, if it is determined at Step 201 that the pressure mode for the wheel brake cylinder to be controlled is not the pressure decrease mode, the program proceeds to Step 214 where the wheel acceleration (DVw) is compared with a second reference value (D2) of a positive value. If the wheel acceleration (DVw) is larger than the second reference value (D2), it is determined that the wheel acceleration (DVw) has been recovered, and the program proceeds to Step 215 where the recovered wheel speed flag (Fd) is set to be "1". If the wheel acceleration (DVw) is equal to or smaller than the second reference value (D2), the program proceeds to Step 216 as it is.

Then, the program proceeds to Steps 216, 217, 218, where the conditions of the reduced output flag (Fg), reduced wheel speed flag (Fw), recovered wheel speed flag (Fd) are determined, respectively. If all the flags are set to be "1", the program proceeds to Step 219 where it is determined that the vehicle ran over the difference in level on the road. In this case, therefore, changing the conditions of the ABS control into the conditions for the road with difference in level is made at Step 111 as shown in FIG. 3. However, if any one of the flags is reset, it is determined that the vehicle has not run over any difference in level on the road, and the program returns to the main routine in FIG. 3B.

The system for detecting the difference in level on the road according to the present invention is not limited to the system used for the anti-skid control system as in the above-described embodiment, but may be applied to a vehicle motion control system including a traction control, vehicle stability control, front-rear braking force distribution control, and the like. In the case where the system for detecting the difference in level on the road is used for the traction control system, parameters to be deter mined are reversed. Namely, they are fallen in an acceleration region. For example, a peak value of the wheel speed (Vw) is used for the reference value. However, the determination of the difference in level on the road is made in accordance with a manner similar to the one made in the aforementioned embodiment.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A system for detecting a difference in height level on a road for vehicles, comprising:

an acceleration sensor for detecting an acceleration of a vehicle and producing a signal proportional to the acceleration;

first determination means for determining if a variation of the signal output from said acceleration sensor is greater than a predetermined range;

wheel speed detection means for detecting a wheel speed of at least one wheel of said vehicle;

wheel acceleration calculating means for calculating a wheel acceleration of said wheel continuously on the basis of the wheel speed detected by said wheel speed detection means;

second determination means for determining if the wheel acceleration calculated by said wheel acceleration calculating means varied in the same direction as that of the variation of the signal output from said acceleration sensor, and then varied in the reverse direction to exceed a predetermined reference value; and height level difference determination means for determining if said wheel ran over a difference in height level on a road, on the basis of the results determined by said first determination means and said second determination means.

2. A system for detecting a difference in height level on a road for vehicles as set forth in claim 1, wherein said first determination means is adapted to determine if the variation of the signal output from said acceleration sensor is greater than the predetermined range, on the basis of a variation of the wheel acceleration calculated by said wheel acceleration calculating means.

3. A system for detecting a difference in height level on a road for vehicles as set forth in claim 1, wherein said height level difference determination means is adapted to determine that said wheel ran over the difference in height level on said road, if said first determination means determines that the variation of the signal output from said acceleration sensor is greater than the predetermined range, and said second determination means determines that the wheel acceleration calculated by said wheel acceleration calculating means exceeds the predetermined reference value.

4. A system for detecting a difference in height level on a road for vehicles as set forth in claim 1, wherein said first determination means is adapted to determine if a decelerating variation of the signal output from said acceleration sensor exceeds a predetermined decelerating range, and wherein said second determination means is adapted to determine if the wheel acceleration calculated by said wheel acceleration calculating means has been increased after the wheel acceleration was decreased, to exceed a predetermined acceleration.

5. A system for detecting a difference in height level on a road for vehicles as set forth in claim 4, wherein said first determination means is adapted to determine that the decelerating variation of the signal output from said acceleration sensor is greater than the predetermined decelerating range, if an absolute value of a difference between a first signal, which is output from said acceleration sensor when the wheel acceleration has become a negative value, and a second signal, which is output from said acceleration sensor when the wheel acceleration has changed from the negative value to a positive value, exceeds a predetermined value.

6. A system for detecting a difference in height level on a road for vehicles as set forth in claim 1, wherein said first determination means is adapted to determine if an accelerating variation of the signal output from said acceleration sensor exceeds a predetermined accelerating range, and wherein said second determination means is adapted to determine if the wheel acceleration calculated by said wheel acceleration calculating means has been decreased after the wheel acceleration was increased, to become lower than a predetermined deceleration.

7. A system for detecting a difference in height level on a road for vehicles and preventing wheels of a vehicle from being locked during braking operation of said vehicle, comprising:

wheel speed sensors for detecting wheel speeds of said wheels;

vehicle speed detection means for detecting a vehicle speed of said vehicle;

slip rate calculation means for calculating a slip rate on the basis of the wheel speeds detected by said wheel speed sensors and the vehicle speed detected by said vehicle speed detection means;

wheel acceleration calculating means for calculating wheel accelerations of said wheels continuously on the basis of the wheel speeds detected by said wheel speed sensors;

a linear acceleration sensor for detecting an acceleration of said vehicle in a longitudinal direction thereof and producing a signal linearly proportional to the detected acceleration;

first determination means for determining if a decelerating variation of the signal output from said linear acceleration sensor is greater than a predetermined decelerating range;

second determination means for determining if the wheel acceleration calculated by said wheel acceleration calculating means has been increased after the wheel acceleration was decreased, to exceed a predetermined acceleration;

height level difference determination means for determining if said wheel ran over a difference in height level on a road, on the basis of the results determined by said first determination means and said second determination means;

wheel brake cylinders operatively mounted on said wheels;

pressure generating means for pressurizing brake fluid to output hydraulic braking pressure in response to depression of a brake pedal; and actuating means disposed between said pressure generating means and said wheel brake cylinders for controlling the hydraulic braking pressure in each of said wheel brake cylinders in accordance with the result calculated by said slip rate calculation means, said actuating means controlling the hydraulic braking pressure in each of said height wheel brake cylinders, when said level difference determination means determines that said vehicle ran over the difference in height level on said road, to be pressurized higher than the hydraulic braking pressure which is controlled when said vehicle is travelling on a paved road.

* * * * *